United States Patent
Saito et al.

(10) Patent No.: US 12,096,332 B2
(45) Date of Patent: Sep. 17, 2024

(54) REGISTERED EDGE DEVICE MANAGEMENT

(71) Applicant: International Business Machines Corporation, Armonk, NY (US)

(72) Inventors: Akira Saito, Ichikawa (JP); Mitsuru Chinen, Yokohama (JP); Takeshi Watanabe, Kawasaki (JP); Taku Sasaki, Machida (JP); Takuya Matsunaga, Ichikawa (JP)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 17/655,842

(22) Filed: Mar. 22, 2022

(65) Prior Publication Data

US 2023/0308983 A1    Sep. 28, 2023

(51) Int. Cl.
*H04W 40/18*    (2009.01)
*H04W 40/20*    (2009.01)

(52) U.S. Cl.
CPC .......... *H04W 40/18* (2013.01); *H04W 40/20* (2013.01)

(58) Field of Classification Search
CPC ....... H04W 40/18; H04W 40/20; H04W 4/22; H04W 4/90; H04W 4/021; G06F 40/295; G06F 40/166; G06F 16/906; G06F 16/908; G06T 11/20

See application file for complete search history.

(56) References Cited

U.S. PATENT DOCUMENTS

| 8,970,699 | B2 | 3/2015 | Hong |
| 2017/0337791 | A1 | 11/2017 | Gordon-Carroll |
| 2019/0013903 | A1* | 1/2019 | Zhang ............... H04L 1/1854 |
| 2020/0351336 | A1 | 11/2020 | Campbell |
| 2021/0245711 | A1 | 8/2021 | Nagata |

(Continued)

FOREIGN PATENT DOCUMENTS

| CN | 112559187 A | 3/2021 |
| CN | 108874525 A | 6/2021 |
| CN | 113660696 A | 11/2021 |

OTHER PUBLICATIONS

Basic et al., "Fuzzy Handoff Control in Edge Offloading", 2019 IEEE International Conference on Fog Computing (ICFC), pp. 87-96, DOI 10.1109/ICFC.2019.00020.

(Continued)

*Primary Examiner* — Wei Zhao
(74) *Attorney, Agent, or Firm* — Jared J. Chaney

(57) ABSTRACT

A method can include obtaining device data for a set of edge devices. The method can further include obtaining a predicted travel path of a focal entity. The method can further include determining, for a first edge device of the set of edge devices and based on the device data, a first proximity of the first edge device to the predicted travel path. The method can further include selecting the first edge device based, at least in part, on the first proximity. The method can further include transmitting, in response to the selecting the first edge device, a workload to the first edge device. The method can further include receiving, in response to the transmitting the workload, first captured data obtained by the first edge device. The method can further include transmitting the first captured data to an electronic user device.

25 Claims, 6 Drawing Sheets

(56) References Cited

U.S. PATENT DOCUMENTS

2022/0400533 A1* 12/2022 Kalkunte .............. H04W 88/04
2023/0141589 A1* 5/2023 Stenneth ................ H04L 67/12
                                                                                                    709/217

OTHER PUBLICATIONS

Mell et al., "The NIST Definition of Cloud Computing", National Institute of Standards and Technology, Special Publication 800-145, Sep. 2011, 7 pages.

Wu et al., "A Trust-aware Task Offloading Framework in Mobile Edge Computing", IEEE Access, vol. 4, 2016, 15 pages, DOI 10.1109/ACCESS.2019.2947306.

Notification of Transmittal of the International Search Report and the Written Opinion of the International Searching Authority, or the Declaration, International Application No. PCT/EP2023/056813, May 26, 2023, 12 pgs.

* cited by examiner

REGISTERED EDGE DEVICE MANAGEMENT

BACKGROUND

The present disclosure relates to management of networked devices, and more specifically, to registered edge device management.

Edge devices can include a variety of electronic devices that are connected to a network and configured to obtain data, process data, and transmit the processed data to a centralized location, such as a web server or a cloud-based edge device management hub. For example, in some instances, a manufacturing facility can employ edge devices such as cameras, temperature sensors, and humidity sensors. In these instances, each edge device can obtain data about a manufacturing process, perform one or more calculations on the data, and transmit the processed data to a management hub configured to monitor and analyze the manufacturing process. In another example, a government authority can employ edge devices such as cameras, temperature sensors, barometers, and/or air quality sensors. In this example, such edge devices can obtain data regarding matters such as traffic conditions, weather conditions, and/or ambient conditions in a location. The edge devices can process such data and transmit the processed data to a centralized management hub.

Edge device usage can include challenges. For example, in some instances, the utility of the data generated by a set of edge devices can be limited by factors such as a quantity of available edge devices proximate a location of interest, a position (e.g., a viewing orientation) of one or more edge devices, and/or timing of data capture by one or more edge devices. In some instances, a control and/or management configuration of an edge device can limit its ability to provide additional utility, such as executing additional workloads.

SUMMARY

Aspects of the present disclosure are directed toward a method comprising obtaining device data for a set of edge devices. The method can further include obtaining a predicted travel path of a focal entity. The method can further include determining a first proximity of the first edge device to the predicted travel path. The determining can be for a first edge device of the set of edge devices. The determining can be based on the device data. The method can further include selecting the first edge device. The selecting can be based, at least in part, on the first proximity. The method can further include transmitting a workload to the first edge device. The transmitting can be in response to the selecting the first edge device. The method can further include receiving first captured data obtained by the first edge device. The receiving can be in response to the transmitting the workload. The method can further include transmitting the first captured data to an electronic user device.

Advantageously, the aforementioned aspects of the present disclosure can permit data capture by an edge device among a set of edge devices, based on the edge device having a proximity to a predicted travel path of a focal entity. Accordingly, the aforementioned aspects can facilitate the acquisition of accurate data corresponding to a focal entity having a travel path.

Further embodiments of the present disclosure including the aspects discussed in the aforementioned method further comprise where the predicted travel path comprises a first location and a second location. The method can further include the focal entity in the first location at a first time. The focal entity can be predicted to be in the second location at a second time. The second time can be subsequent to the first time. The method can further include selecting a second edge device of the set of edge devices. The selecting can be based, at least in part, on a second proximity of the second edge device to the second location. The method can further include transmitting the workload to the second edge device. The transmitting can be in response to the selecting the second edge device. The method can further include receiving second captured data. The second captured data can be obtained by the second edge device. The receiving can be in response to the transmitting the workload to the second device. The method can further include transmitting the second captured data to the electronic user device.

Advantageously, the aforementioned aspects of the present disclosure can permit a plurality of edge devices to accurately capture data regarding a focal entity over time as the focal entity moves.

Further embodiments of the present disclosure including the aspects discussed in the aforementioned method further comprise where the transmitting the workload to the second edge device occurs at an intermediate time. The method can further include the second time subsequent to the intermediate time.

Advantageously, the aforementioned aspects of the present disclosure can improve a likelihood that data regarding a focal entity can be captured before the focal entity exits a location, as edge devices can obtain a workload before the focal entity reaches a location.

Additional aspects of the present disclosure are directed to systems and computer program products configured to perform the methods described above.

Aspects of the present disclosure are directed toward a method comprising obtaining device data for a set of edge devices. The method can further include obtaining a predicted travel path of a focal entity. The method can further include determining that the subset is within a threshold distance of the predicted travel path. The determining can be for a subset of the set of edge devices. The determining can be based on the device data. The subset can comprise a mobile phone and a camera mounted to a building. The method can further include transmitting a workload to the subset. The transmitting can be in response to the determining. The method can further include receiving captured images. The captured images can be obtained by the subset. The receiving can be in response to the transmitting the workload. The method can further include transmitting the captured images to an electronic user device.

Advantageously, the aforementioned aspects of the present disclosure can permit a variety of types of edge devices to capture data regarding a focal entity having a travel path.

Aspects of the present disclosure are directed toward a method comprising obtaining device data for a set of edge devices. The method can further include obtaining a workload request from an electronic user device. The method can further include obtaining a predicted travel path of a focal entity. The method can further include determining that a subset of the set of edge devices is within a threshold distance of the predicted travel path. The determining can be in response to the workload request. The subset can comprise a mobile phone. The subset can further comprise a camera mounted to a building. The method can further include transmitting a workload corresponding to the workload request to the subset. The transmitting can be in response to the determining. The method can further include receiving captured images obtained by the subset. The receiving can be in response to the transmitting the workload. The method can further include transmitting the captured images to the electronic user device. The transmitting can be in response to the workload request.

Advantageously, the aforementioned aspects of the present disclosure can permit a variety of types of edge devices to capture images regarding a moving focal entity and transmit the captured images to an electronic user device upon request.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
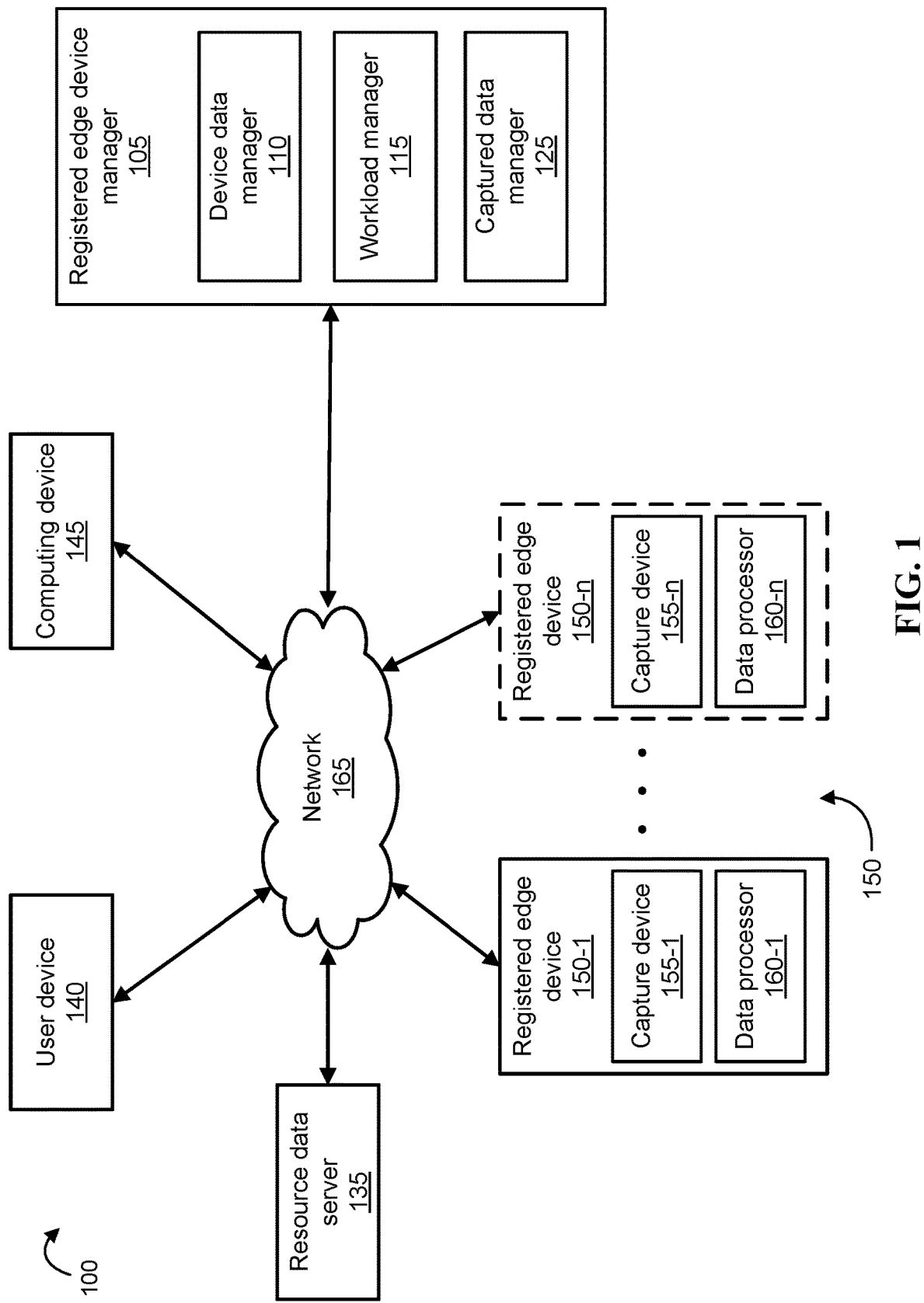
FIG. 1 depicts an example computing environment having a registered edge device manager, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to management of networked devices; more particular aspects relate to registered edge device management. While the present disclosure is not necessarily limited to such applications, various aspects of the disclosure may be appreciated through a discussion of various examples using this context.

Edge devices can include a variety of electronic devices that are connected to a network and configured to obtain data, process data, and transmit the processed data to a centralized location, such as a web server or a cloud-based edge device management hub. For example, in some instances, a manufacturing facility can employ edge devices such as cameras, temperature sensors, and humidity sensors. In these instances, each edge device can obtain data about a manufacturing process, perform one or more calculations on the data, and transmit the processed data to a management hub configured to monitor and analyze the manufacturing process. In another example, a government authority can employ edge devices such as cameras, temperature sensors, barometers, and/or air quality sensors. In this example, such edge devices can obtain data regarding matters such as traffic conditions, weather conditions, and/or ambient conditions in a location. The edge devices can process such data and transmit the processed data to a centralized management hub.

Edge device usage can include challenges. For example, in some instances, the utility of the data generated by a set of edge devices can be limited by factors such as a quantity of available edge devices proximate a location of interest, a position (e.g., a viewing orientation) of one or more edge devices, and/or timing of data capture by one or more edge devices. In some instances, a control and/or management configuration of an edge device can limit its ability to provide additional utility, such as executing additional workloads.

To address these and other challenges, embodiments of the present disclosure include a registered edge device manager ("REDM"). In some embodiments, the REDM can obtain device data for a set of edge devices registered with the REDM, and transmit a workload to a subset of such registered edge devices based on one or more conditions being satisfied. In some embodiments, the set of edge devices can have a respective set of disparate owners and/or custodians who can elect to register the set of edge devices with the REDM. For example, in some embodiments, a set of edge devices can include: (1) a set of outdoor cameras mounted to a commercial building having a first custodian who manages the set of outdoor cameras; (2) a mobile phone with an integrated camera having a first owner; and (3) a residential doorbell camera having a second owner. In this example, the first custodian, the first owner, and the second owner can elect, respectively, to register the set of outdoor cameras, mobile phone, and residential doorbell camera with the REDM. Thus, advantageously, embodiments of the present disclosure can employ a plurality of different types of edge devices having varying capabilities. In some embodiments, the REDM can obtain a predicted travel path of a focal entity, such as a storm system or a tornado, and transmit a workload to a subset of edge devices within a threshold proximity to the focal entity. Thus, advantageously, embodiments of the present disclosure can employ registered edge devices to capture data in locations relative to a moving focal entity. In some embodiments, the REDM can transmit a workload to a subset of registered edge devices proximate a second location on the predicted travel path. In these embodiments, the REDM can perform such transmitting prior to a time that the moving focal entity is predicted to be in the second location. For example, continuing with the tornado example above, the predicted travel path of the tornado can include the tornado being in a first city at a first time and in a second city at a second time. In this example, the REDM can transmit, prior to the second time, a workload (e.g., an instruction to capture image and audio data) to registered edge devices in the second location. Thus, advantageously, embodiments of the present disclosure can employ registered edge devices in a manner that can allow sufficient time to capture data for a moving focal entity.

Turning to the figures, FIG. 1 illustrates a computing environment 100 that includes at least one of each of a registered edge device manager (REDM) 105, a set of registered edge devices 150, a resource data server 135, a user device 140, and a computing device 145. In some embodiments, the at least one REDM 105, set of registered edge devices 150, resource data server 135, user device 140, and computing device 145 can exchange data with one another through a network 165. The set of registered edge devices 150 can include one or more registered edge devices. For example, in some embodiments, the set of registered edge devices 150 can include n registered edge devices, where n is an integer greater than zero. For example, n=1 in embodiments in which the set of registered edge devices 150 includes only a first registered edge device 150-1 having a capture device 155-1 and a data processor 160-1; n=2 in embodiments in which the set of registered edge devices 150 includes two registered edge devices (a first registered edge device 150-1, as described above, and a second registered edge device 150-2 having a capture device 155-2 and a data processor 160-2); and so on. In some embodiments, one or more of the REDM 105, set of registered edge devices 150, resource data server 135, user device 140, computing device 145, and the network 165 can include a computer system, such as the computer system 401 described with respect to FIG. 4.

Referring back to FIG. 1, in some embodiments, the REDM 105 can be included in software installed on a computer system of at least one of the user device 140 and/or computing device 145. The REDM 105 can include program instructions implemented by a processor, such as a processor of computing device 145, to perform one or more operations discussed with respect to FIG. 2.

In some embodiments, the REDM 105 can include one or more modules, such as device data manager 110, workload manager 115, and captured data manager 125. In some embodiments, device data manager 110, workload manager 115, and captured data manager 125 can be integrated into a single module. In some embodiments, the device data manager 110, workload manager 115, and/or captured data manager 125 can obtain data, analyze data, store data, and/or transmit data. In some embodiments, device data manager 110, workload manager 115, and captured data manager 125 can include program instructions implemented by a processor, such as a processor of a computing device 145, to perform one or more operations discussed with respect to FIG. 2. For example, in some embodiments, device data manager 110 can include program instructions to perform operation 205, FIG. 2. In some embodiments, workload manager 115 can include program instructions to perform operations 210-250, FIG. 2. In some embodiments, captured data manager 125 can include program instructions to perform operations 255 and 260, FIG. 2. REDM 105 can autonomously perform operations discussed with respect to FIG. 2; thus, REDM 105 can efficiently and accurately perform operations of method 200 in embodiments in which the set of registered edge devices 150 includes a multitude of registered edge devices **150-*n***.

In some embodiments, the set of registered edge devices 150 can include one or more electronic devices such as a camera, mobile phone (e.g., a "smartphone"), tablet, wearable technology (e.g., a "smartwatch"), sensor (e.g., temperature, humidity, air quality, and/or pressure sensor), and/or a sound recording device. In some embodiments, the set of registered edge devices 150 can include one or more cameras configured to capture images and/or sounds of a public space. For example, such cameras can include a camera mounted to a commercial building such that the camera can capture images and/or sounds from areas proximate the commercial building, such as a parking lot, roadway, building entrance and/or exit, and the like. In another example, such cameras can include a camera mounted to a residential building, such as a doorbell camera, that can capture images and/or sounds from areas proximate the residential building, such as a street or cul-de-sac in front of the residential building. In another example, such cameras can include a camera mounted to a physical structure such as a bridge, utility pole, and the like, that can capture images and/or sounds from areas such as highways, street intersections, and the like. In some embodiments, such cameras can include cameras installed in vehicles that can capture images and/or sounds proximate such vehicles. Advantageously, the set of registered edge devices 150 can include a plurality of types of electronic devices that can obtain a plurality of types of data. Furthermore, in some embodiments, registered edge devices among the set of registered edge devices 150 can have separate, distinct, and/or unaffiliated owners and/or custodians who possess and/or manage such registered edge devices. Advantageously, as discussed further below, the REDM 105 can transmit workloads to edge devices registered by numerous disparate owners and/or custodians. Thus, in some embodiments, the REDM 105 may not be limited to obtaining data from one or more edge devices owned and/or managed by a single entity.

In some embodiments, registered edge device **150-*n* can include at least one capture device 155-*n* and/or a data processor 160-*n*. In some embodiments, the at least one capture device 155-*n* can include a sensor, audio capture device, and/or image capture device. For example, in embodiments in which registered edge device 150-*n* is a smartphone, the smartphone can include a plurality of capture devices 155-*n*, such as an accelerometer, a camera, and/or a microphone. In another example, in embodiments in which registered edge device 150-*n* is a camera, the camera can include a plurality of capture devices 155-*n*, such as a temperature, humidity, and/or pressure sensor. In some embodiments, the at least one data processor 160-*n* can include a processor identical or substantially similar to processor 410, FIG. 4. In some embodiments, data processor 160-*n* can be configured to analyze, manipulate, and/or perform computations on data obtained by registered edge device 150-*n*. For example, in some embodiments, data processor 160-*n* can be configured to filter data obtained by registered edge device 150-*n*. For example, in some embodiments, registered edge device 150-*n* can include image analysis software that can permit the data processor 160-*n* to perform functions such as obscuring, cropping, and/or redacting images captured by registered edge device 150-*n***.

In some embodiments, the at least one resource data server 135 can include one or more web servers. In some embodiments, the at least one resource data server 135 can correspond to a service, such as a weather service, an emergency alert service, and/or a police service. In some embodiments, the at least one resource data server 135 can include software configured to analyze data to predict a travel path of a moving focal entity, such as a storm system or a vehicle. For example, in some embodiments, a weather service can generate, by one or more resource data servers 135 analyzing weather data, a predicted travel path of a hurricane. In these embodiments, the predicted travel path can include a prediction that the hurricane will be in a first location at a first time and in a second location at a second, subsequent time. In another example, in some embodiments, a highway patrol service can generate, by one or more resource data servers 135 analyzing data such as traffic patterns, roadway maps, global positioning system (GPS) coordinates, and/or vehicle speed and/or direction, a predicted travel path of a vehicle. In these embodiments, the predicted travel path can include a prediction that the vehicle will be in a first location at a first time and in a second location at a second, subsequent time.

In some embodiments, the at least one user device 140 can include a device such as a notebook computer, tablet, desktop computer, mobile phone (e.g., a "smartphone"), tablet, wearable technology (e.g., a "smartwatch"), and the like. In some embodiments, a user, such as an owner and/or custodian of a user device 140 can transmit a workload request from the user device 140 to the REDM 105, as discussed in further detail below. In some embodiments, such a user can be separate, distinct, and/or unaffiliated with owners and/or custodians who possess and/or manage registered edge devices of the set of registered edge devices 150. In some embodiments, an owner and/or custodian of an edge device can employ a user device 140 to register the edge device with the REDM 105. Such a registration can permit the REDM 105 to transmit a workload to the registered edge device according to embodiments of the present disclosure.

In some embodiments, the at least one computing device 145 can include a device such as a computer, web server, and the like. In some embodiments, the network 165 can be a wide area network (WAN), a local area network (LAN), the internet, or an intranet. In some embodiments, the network 165 can be substantially similar to, or the same as, cloud computing environment 50 discussed with respect to FIG. 5.

Figure 2:
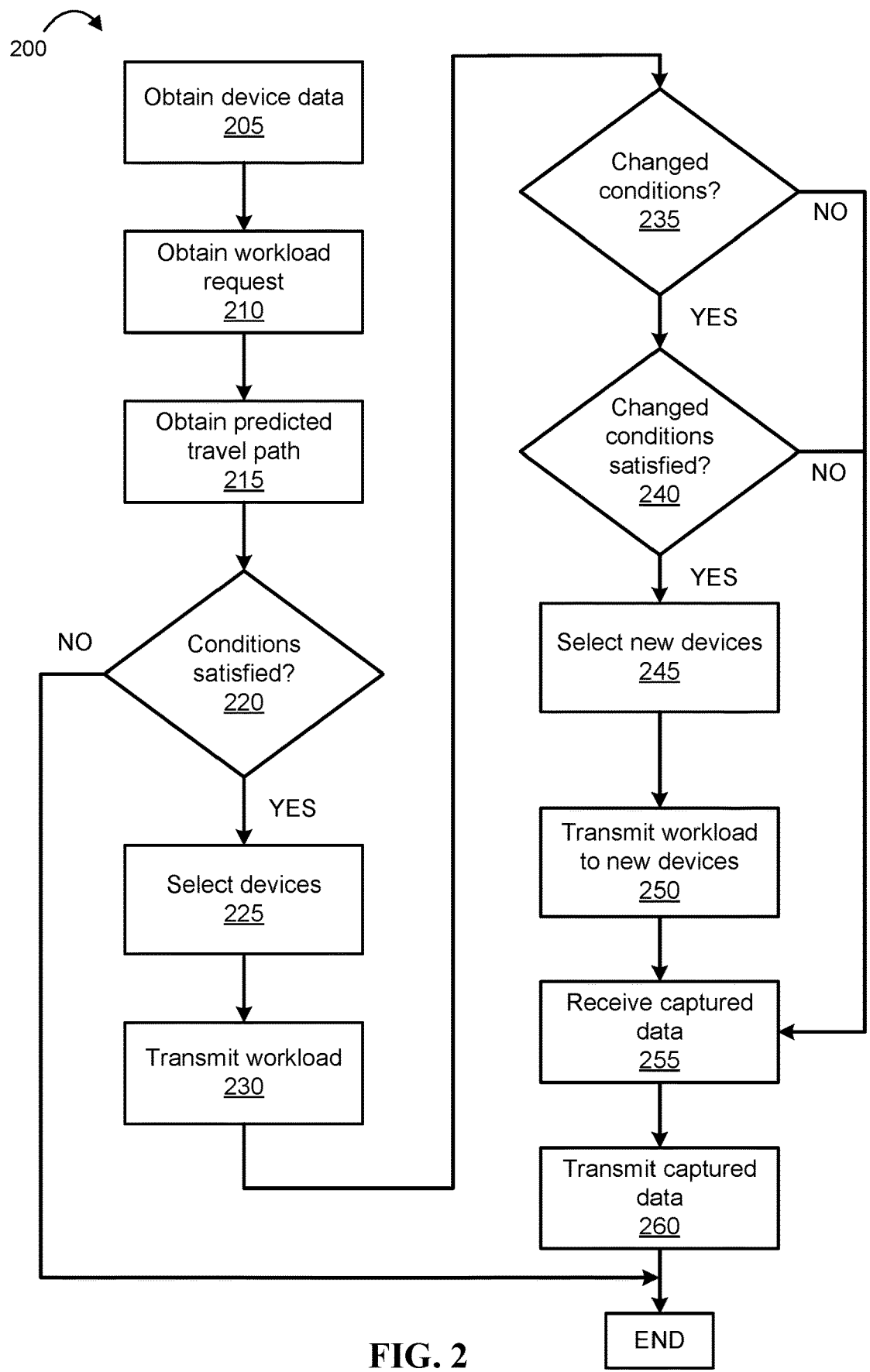
FIG. 2 depicts a flowchart of an example method for performing registered edge device management, in accordance with embodiments of the present disclosure.

FIG. 2 illustrates a flowchart of an example method 200 for performing registered edge device management, in accordance with embodiments of the present disclosure. Method 200 can be performed by an REDM, such as the REDM 105 discussed with respect to FIG. 1.

Turning back to FIG. 2, in operation 205, to register an edge device with the REDM, the REDM can obtain device data corresponding to one or more characteristics of the edge device. In some embodiments, device data can include one or more technical specifications of an edge device. For example, in some embodiments, device data can include an identification of a device type (e.g., whether a device is a mobile phone, a mounted camera, or an air quality sensor), brand, and/or model number. In some embodiments, device data can specify one or more capture devices included with the edge device. For example, device data for a smartphone edge device can indicate that the smart phone includes a camera and a microphone as capture devices. In some embodiments, device data can indicate a quality of data capture of the edge device, such as a range of image resolutions that a camera can capture. In some embodiments, device data can indicate a processing capability of a data processor of the edge device, such as a processing speed, image analysis capability, and/or image filtering capability of a data processor. In some embodiments, device data can include information regarding a wireless data transmission speed of the edge device. In some embodiments, device data can include information regarding an available power or storage capacity of an edge device. For example, in some embodiments, device data for an edge device such as a smartwatch can include a remaining battery power of the smart watch and/or a size of available data storage space within the memory of the smartwatch. In some embodiments, device data can include location and/or orientation information corresponding to an edge device. For example, in some embodiments, such information can include GPS coordinates and/or a location description (e.g., camera at first Street and Main, north campus parking lot camera, etc.). In some embodiments, such information can include a mounting height and/or a direction that an edge device, such as a camera, is facing and/or can be faced. In some embodiments, device data can include a workload status of an edge device, such as whether the edge device is executing a workload request.

In some embodiments, device data can be selected by an owner and/or custodian of an edge device. For example, in some embodiments, such an owner and/or custodian can make selections regarding an availability of the edge device to receive a workload from the REDM. For example, in some embodiments, such an owner and/or custodian can designate one or more dates, times, and/or time periods when the edge device can receive a workload from the REDM. For example, a custodian of a set of parking lot cameras can designate that the set of cameras can receive a workload from the REDM between 10 AM and 11 AM on Tuesdays. In another example, such a custodian can designate that the set of cameras receive a workload from the REDM if the workload has an execution time that does not exceed a threshold, such as a 30-second threshold. In some embodiments, an owner and/or custodian of an edge device can designate a degree of urgency to be met for the edge device to receive a workload from the REDM. For example, in some embodiments, an owner of a doorbell camera can designate that the doorbell camera will not receive a workload from the REDM unless the workload has an emergency classification. In some embodiments, an owner and/or custodian of an edge device can limit and availability of the edge device according to an entity submitting the workload request to the REDM. For example, in some embodiments, an owner of a security camera can designate that the security camera will not receive a workload from an entity other than a policing authority that submitted the corresponding workload request to the REDM. In some embodiments, an owner and/or custodian can submit device data indicating that an edge device will not receive a workload from the REDM until the owner and/or custodian provides specific consent to such a workload, such as by transmitting a consent notification to the REDM by a user device.

In some embodiments, operation 205 can include the REDM obtaining device data from one or more edge devices and/or from one or more user devices (e.g., user device 140, FIG. 1). For example, in some embodiments, an owner and/or custodian of one or more edge devices can elect to register such edge devices with the REDM by transmitting device data to the REDM by such a user device. In some embodiments, operation 205 can include the REDM storing device data to a storage location of the REDM.

In operation 210, the REDM can obtain a workload request. A workload can refer to a set of tasks for a registered edge device, such as capturing image, audio, and/or sensor data (i.e., captured data), processing such captured data, and transmitting such captured data to the REDM. A workload request can refer to a request (e.g., a call, command, or program instruction) transmitted to the REDM for one or more registered edge devices to execute the workload. In some embodiments, an entity, such as a private, individual user or a government authority, can transmit a workload request to the REDM by a user device (e.g., user device 140, FIG. 1). For example, in some embodiments, a workload request can include a request by a bicycle owner to have available cameras capture images in an area near a bicycle rack where the owner's bicycle is locked. In this example, such images can assist the user in preventing damage or theft to the bicycle. In another example, in some embodiments, a workload request can include a request by a government authority to have available cameras, temperature sensors, and air quality sensors collect images, temperature data, and air quality data in a region of a city after an earthquake has occurred. In this example, such captured data can assist the government authority in determining where to render aid.

In some embodiments, a workload request can include various types of data regarding the workload request. For example, in some embodiments, a workload request can include location information for a focal entity and/or identifying characteristics of a focal entity. A focal entity can refer to an entity such as a person, animal, vehicle, or weather entity (e.g., a storm, hurricane, typhoon, tornado, and the like) that can be the subject of a workload request. For example, in the example involving the bicycle rack discussed above, a focal entity can include the bicycle rack and/or the bicycle. As discussed in further detail below, in some embodiments, a focal entity can have a predicted travel path.

In some embodiments, a workload request can include a specification for a type of registered edge device to execute the workload. For example, in some embodiments, a workload request can specify that an audio capture device to obtain audio data or that a mobile phone obtain images without audio data. In some embodiments, the workload request can include a brand and/or model number of a registered edge device to execute the workload. In some embodiments, the workload request can include a specification for a quality of data capture of the registered edge device, such as a threshold image resolution for a captured image. In some embodiments, a workload request can include a specification regarding a processing capability corresponding to a registered edge device. For example, in some embodiments, a workload request can specify a type of image filter to be applied to a captured image. In some embodiments, a workload request can specify a threshold wireless data transmission speed of the registered edge device. In these embodiments, such a specification can facilitate efficient data transfer when time is of the essence regarding obtaining captured data. In some embodiments, a workload request can include a specification for a location and/or orientation of a registered edge device. For example, in some embodiments, a workload request can include a threshold distance from a focal entity within which a set of registered edge devices is to be located. In some embodiments, a workload request can include a threshold distance from a predicted travel path within which a set of registered edge devices is to be located. In some embodiments, a workload request can include a specification for a date, time, and/or time period for a registered edge device to execute a workload. In some embodiments, the workload request can include a specification regarding a degree of urgency of the workload. For example, in some embodiments, an entity transmitting the workload request to the REDM can classify the workload as a "non-urgent," "urgent," or "emergency" workload, where the "non-urgent" classification has a lowest degree of urgency, and the "emergency" classification has a highest degree of urgency. In some embodiments, a workload request can specify the entity submitting the workload request to the REDM.

In some embodiments, operation 210 can include the REDM obtaining the workload request from a user device (e.g., user device 140, FIG. 1). For example, in some embodiments, an entity can submit a workload request to the REDM by such a user device. In some embodiments, operation 210 can include the REDM storing the workload request in a storage location of the REDM.

In some embodiments, in operation 215, the REDM can obtain a predicted travel path for a focal entity. In some embodiments, a predicted travel path can include a set of geographic locations where a moving focal entity is predicted to be present and a respective set of times when the moving focal entity is predicted to be present. For example, a predicted travel path for a vehicle traveling on a highway can include the vehicle arriving in a first city at a first time and arriving in a second city at a second time subsequent to the first time. In some embodiments, the REDM can obtain a predicted travel path from a resource data server (e.g., resource data server 135, FIG. 1) of an entity such as a government authority or a company providing data analysis services. In some embodiments, the REDM can obtain a predicted travel path from a user device (e.g., user device 140, FIG. 1). For example, in some embodiments, a user can determine a predicted travel path and transmit it to the REDM by such a user device. In some embodiments, operation 215 can include the REDM storing the predicted travel path to a storage location of the REDM.

In operation 220, the REDM can determine whether one or more conditions corresponding to a workload request are satisfied. In some embodiments, such a determination can include the REDM comparing and/or analyzing data obtained in operations 205-215 to identify whether corresponding data matches and/or whether one or more thresholds are exceeded. For example, in some embodiments, the REDM can determine that a condition is satisfied in response to identifying that a type of registered edge device (e.g., a smartphone) specified in a workload request matches a type of registered edge device (e.g., a smartphone) included in the device data for a registered edge device. In some embodiments, the REDM can determine that a condition is satisfied in response to identifying that a location (e.g., GPS coordinates) of a registered edge device specified in the device data for a registered edge device does not exceed a threshold distance from a focal entity or from a predicted travel path of a focal entity.

In operation 220, in response to determining that one or more conditions corresponding to a workload request are satisfied, the REDM can proceed to operation 225. Alternatively, in response to determining that such conditions are not satisfied, method 200 can end.

In operation 225, the REDM can select one or more registered edge devices to which the REDM can transmit a workload of a corresponding workload request. In some embodiments, operation 225 can include the REDM selecting (e.g., identifying) a subset of registered edge devices among a set of registered edge devices for which the REDM obtained device data in operation 205.

In operation 230, the REDM can transmit a workload to the one or more registered edge devices selected in operation 225. In some embodiments, operation 230 can include the REDM transmitting data obtained in operation 210 to one or more registered edge devices. In some embodiments, operation 230 can include the REDM issuing a command to one or more registered edge devices to execute a workload. In some embodiments, operation 230 can include the REDM transmitting a notification to one or more registered edge devices. For example, in embodiments in which a registered edge device is a smartphone, the REDM can transmit a text notification to the smartphone requesting that the owner and/or custodian of the smartphone execute a workload by the smartphone, such as capturing a one-minute-long video recording of a street intersection proximate the smartphone.

In operation 235, in some embodiments, the REDM can determine if one or more changes in data corresponding to a workload request are present. For example, in embodiments that include a set of registered edge devices capturing data within a threshold distance of a moving focal entity or a predicted travel path, a location of the focal entity or a predicted location of the focal entity can change with the passage of time. In these embodiments, the REDM can determine that one or more changes in data corresponding to a workload request are present.

In operation 235, in response to determining that one or more changes in data corresponding to a workload request are present, the REDM can proceed to operation 240. Alternatively, in response to determining that such changes are not present, the REDM can proceed to operation 255.

In operation 240, the REDM can determine whether one or more conditions corresponding to a workload request are satisfied. Operation 240 can be identical or substantially similar to operation 220. Continuing with the example discussed above regarding capturing data within a threshold distance of a predicted travel path, in operation 240, the REDM can determine that a condition is satisfied in response to identifying that a location of a registered edge device does not exceed a predicted second location of the moving focal entity.

In operation 240, in response to determining that one or more conditions corresponding to a workload request are satisfied, the REDM can proceed to operation 245. Alternatively, in response to determining that such conditions are not satisfied, the REDM can proceed to operation 255.

In operation 245, the REDM can select one or more new registered edge devices to which the REDM can transmit a workload of a corresponding workload request. In some embodiments, such new registered edge devices can be different from the one or more registered edge devices selected in operation 225. Operation 245 can be identical or substantially similar to operation 225.

In operation 250, the REDM can transmit a workload to the one or more new registered edge devices selected in operation 245. Operation 250 can be identical or substantially similar to operation 230.

In operation 255, in response to the workload transmitted to one or more registered edge devices, the REDM can receive captured data obtained by the one or more registered edge devices. In some embodiments, operation 255 can include one or more registered edge devices transmitting captured data to the REDM. In some embodiments, such captured data can include filtered images, such as images having obscured portions to protect the privacy of individuals included in the images. In these embodiments, such images can be filtered by a registered edge device according to a filter specification included in a workload. Such a workload being transmitted to the registered edge device in operation 230 and/or 250.

In operation 260, the REDM can transmit the captured data. For example, in some embodiments, the REDM can transmit the captured data to a user device of the entity that submitted the workload request in operation 210. In some embodiments, operation 260 can include the REDM deleting the captured data from a memory of the REDM and/or from one or more registered edge devices to facilitate data privacy.

Figure 3:
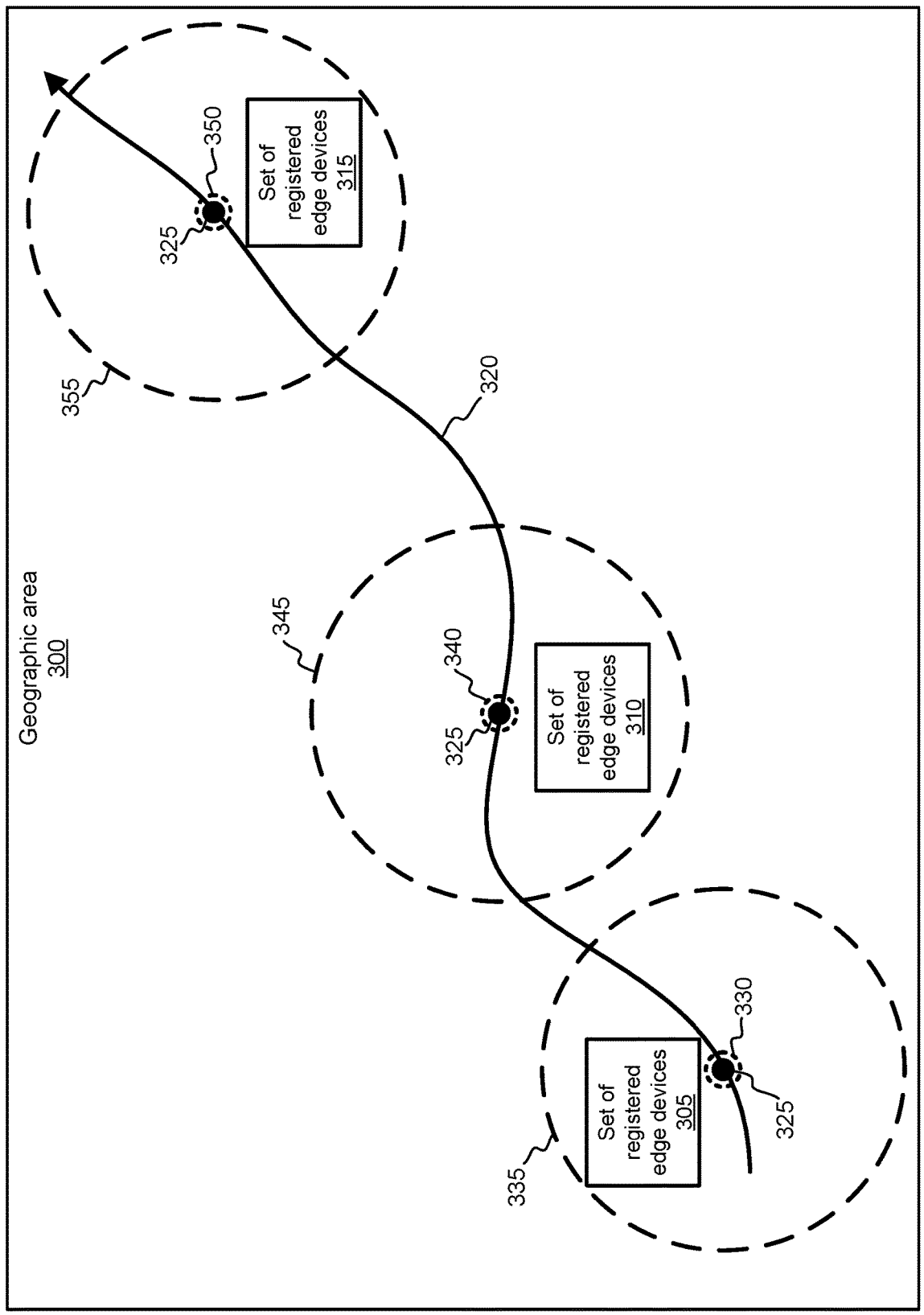
FIG. 3 depicts an example geographic area in which registered edge device management is implemented, in accordance with embodiments of the present disclosure.

FIG. 3 depicts an example geographic area 300 in which registered edge device management is implemented, in accordance with embodiments of the present disclosure. In this example, a focal entity 325, such as an eye of a hurricane, can be in a first location 330 at a first time. Further in this example, a weather service can generate a predicted travel path 320 of the hurricane. The predicted travel path 320 can indicate that the hurricane will be in a second location 340 at a second time subsequent to the first time. The predicted travel path 320 can further indicate that the hurricane will be in a third location 350 at a third time subsequent to a second time. Further in this example, an emergency response team can transmit a workload request to an REDM by a user device. The workload request can specify a first region 335 having a 10-kilometer (km) radius around the first location 330; a second region 345 having a 15 km radius around the second location 340; and a third region 355 having a 15 km radius around the third location 350. The workload request can further specify that cameras within the first region 335, second region 345, and third region 355 capture outdoor images. Further in this example, the REDM can identify sets of registered edge devices 305, 310, and 315 that satisfy the conditions of the workload request. Further in this example, the REDM can transmit a workload corresponding to the workload request to each set of registered edge devices 305, 310, and 315, such that the workload is transmitted to the set of registered edge devices 310 at a time prior to the second time, and the workload is transmitted to the set of registered edge devices 315 at a time prior to the third time. Further in this example, in response to the transmitted workload, the REDM can receive captured data from the sets of registered edge devices 305, 310, and 315. Further in this example, the REDM can transmit the captured data to the user device of the emergency response team. In this way, the emergency response team can acquire accurate, comprehensive information that can facilitate an effective emergency response.

Figure 4:
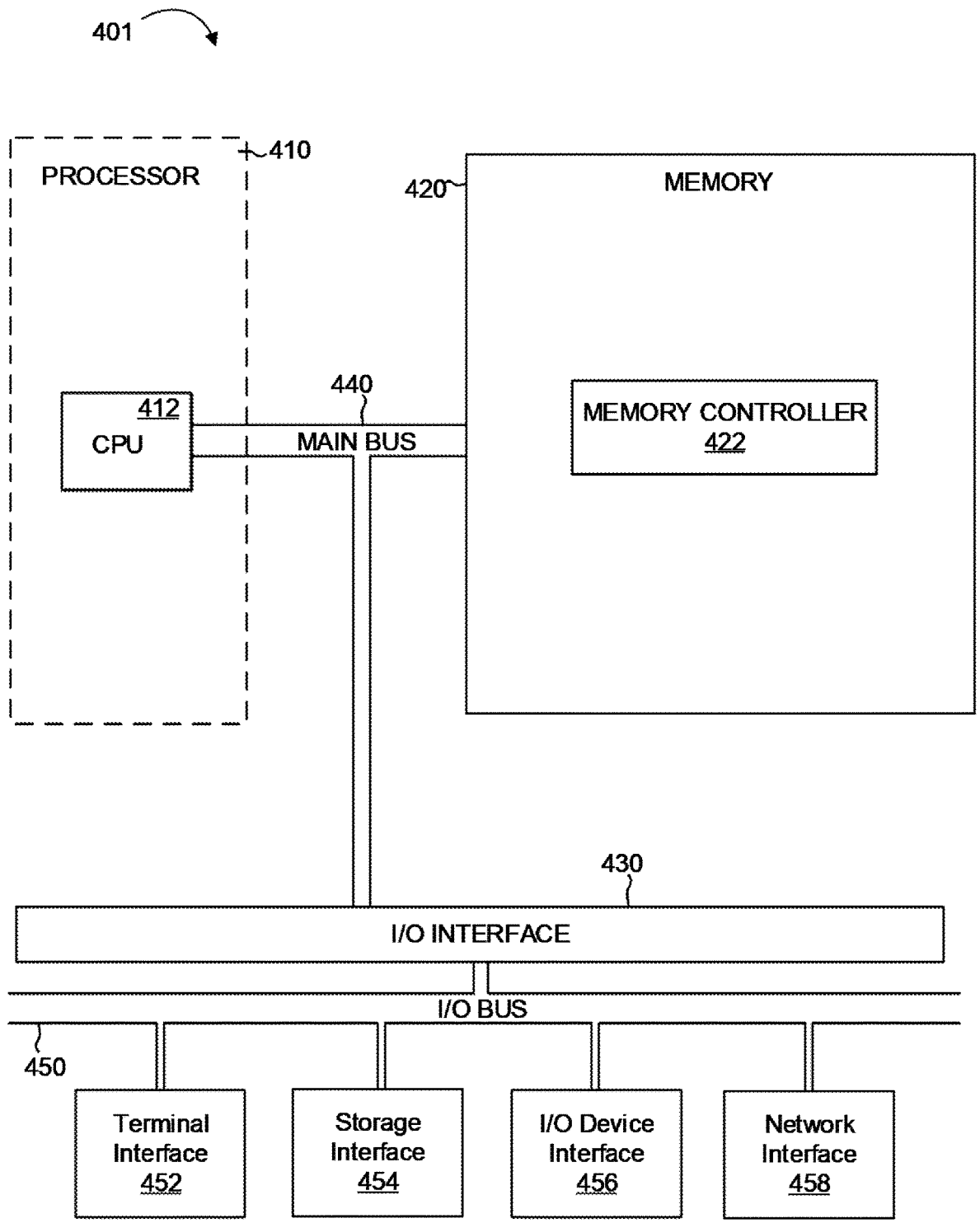
FIG. 4 depicts the representative major components of a computer system that can be used in accordance with embodiments of the present disclosure.

FIG. 4 depicts the representative major components of an exemplary Computer System 401 that can be used in accordance with embodiments of the present disclosure. The particular components depicted are presented for the purpose of example only and are not necessarily the only such variations. The Computer System 401 can comprise a Processor 410, Memory 420, an Input/Output Interface (also referred to herein as I/O or I/O Interface) 430, and a Main Bus 440. The Main Bus 440 can provide communication pathways for the other components of the Computer System 401. In some embodiments, the Main Bus 440 can connect to other components such as a specialized digital signal processor (not depicted).

The Processor 410 of the Computer System 401 can be comprised of one or more CPUs 412. The Processor 410 can additionally be comprised of one or more memory buffers or caches (not depicted) that provide temporary storage of instructions and data for the CPU 412. The CPU 412 can perform instructions on input provided from the caches or from the Memory 420 and output the result to caches or the Memory 420. The CPU 412 can be comprised of one or more circuits configured to perform one or methods consistent with embodiments of the present disclosure. In some embodiments, the Computer System 401 can contain multiple Processors 410 typical of a relatively large system. In other embodiments, however, the Computer System 401 can be a single processor with a singular CPU 412.

The Memory 420 of the Computer System 401 can be comprised of a Memory Controller 422 and one or more memory modules for temporarily or permanently storing data (not depicted). In some embodiments, the Memory 420 can comprise a random-access semiconductor memory, storage device, or storage medium (either volatile or non-volatile) for storing data and programs. The Memory Controller 422 can communicate with the Processor 410, facilitating storage and retrieval of information in the memory modules. The Memory Controller 422 can communicate with the I/O Interface 430, facilitating storage and retrieval of input or output in the memory modules. In some embodiments, the memory modules can be dual in-line memory modules.

The I/O Interface 430 can comprise an I/O Bus 450, a Terminal Interface 452, a Storage Interface 454, an I/O Device Interface 456, and a Network Interface 458. The I/O Interface 430 can connect the Main Bus 440 to the I/O Bus 450. The I/O Interface 430 can direct instructions and data from the Processor 410 and Memory 420 to the various interfaces of the I/O Bus 450. The I/O Interface 430 can also direct instructions and data from the various interfaces of the I/O Bus 450 to the Processor 410 and Memory 420. The various interfaces can comprise the Terminal Interface 452, the Storage Interface 454, the I/O Device Interface 456, and the Network Interface 458. In some embodiments, the various interfaces can comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—can communicate failures and changes to one or more components to a hypervisor or operating system (not depicted). The hypervisor or the operating system can allocate the various resources available in the Computer System 401 and track the location of data in Memory 420 and of processes assigned to various CPUs 412. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
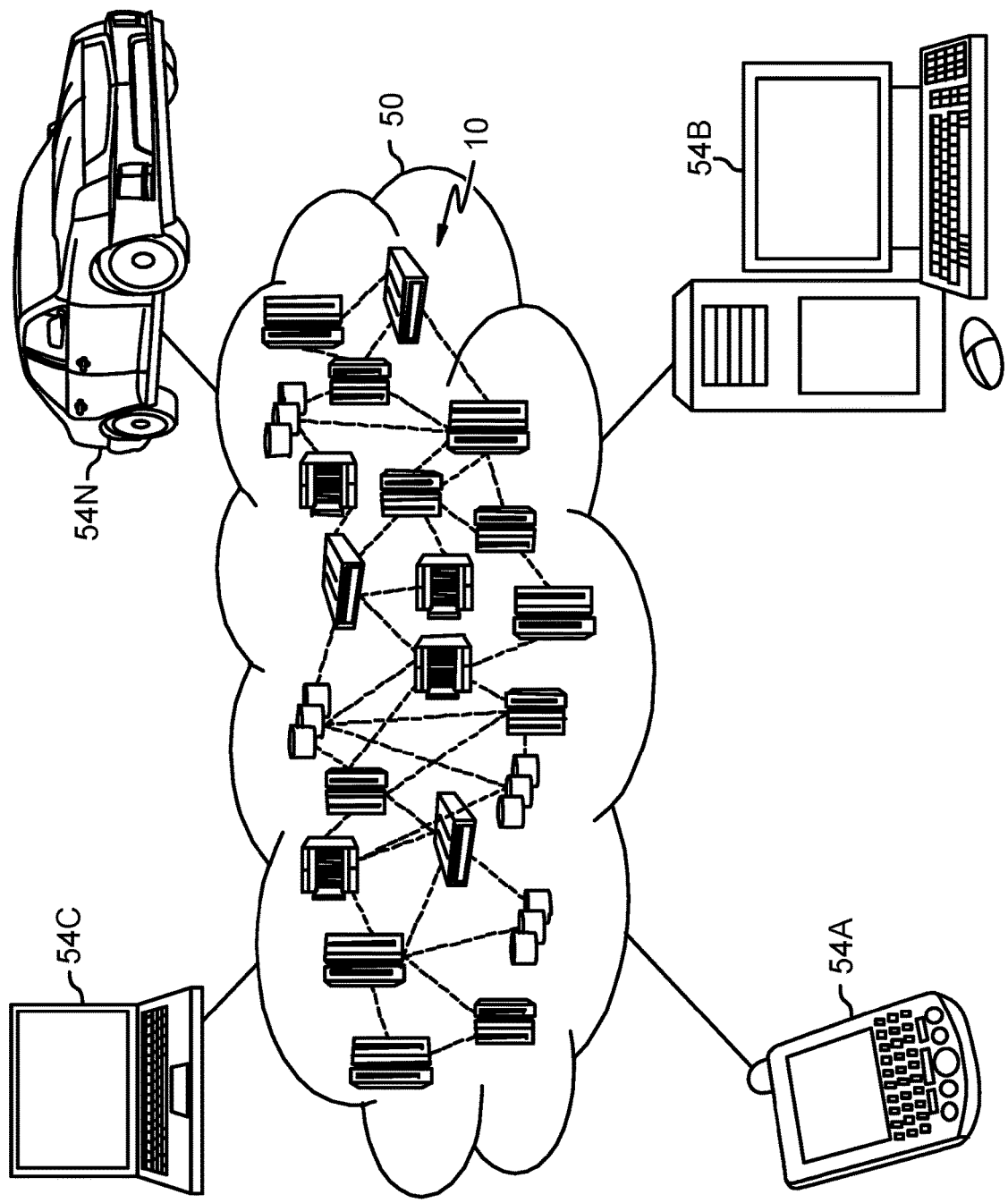
FIG. 5 depicts a cloud computing environment according to embodiments of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
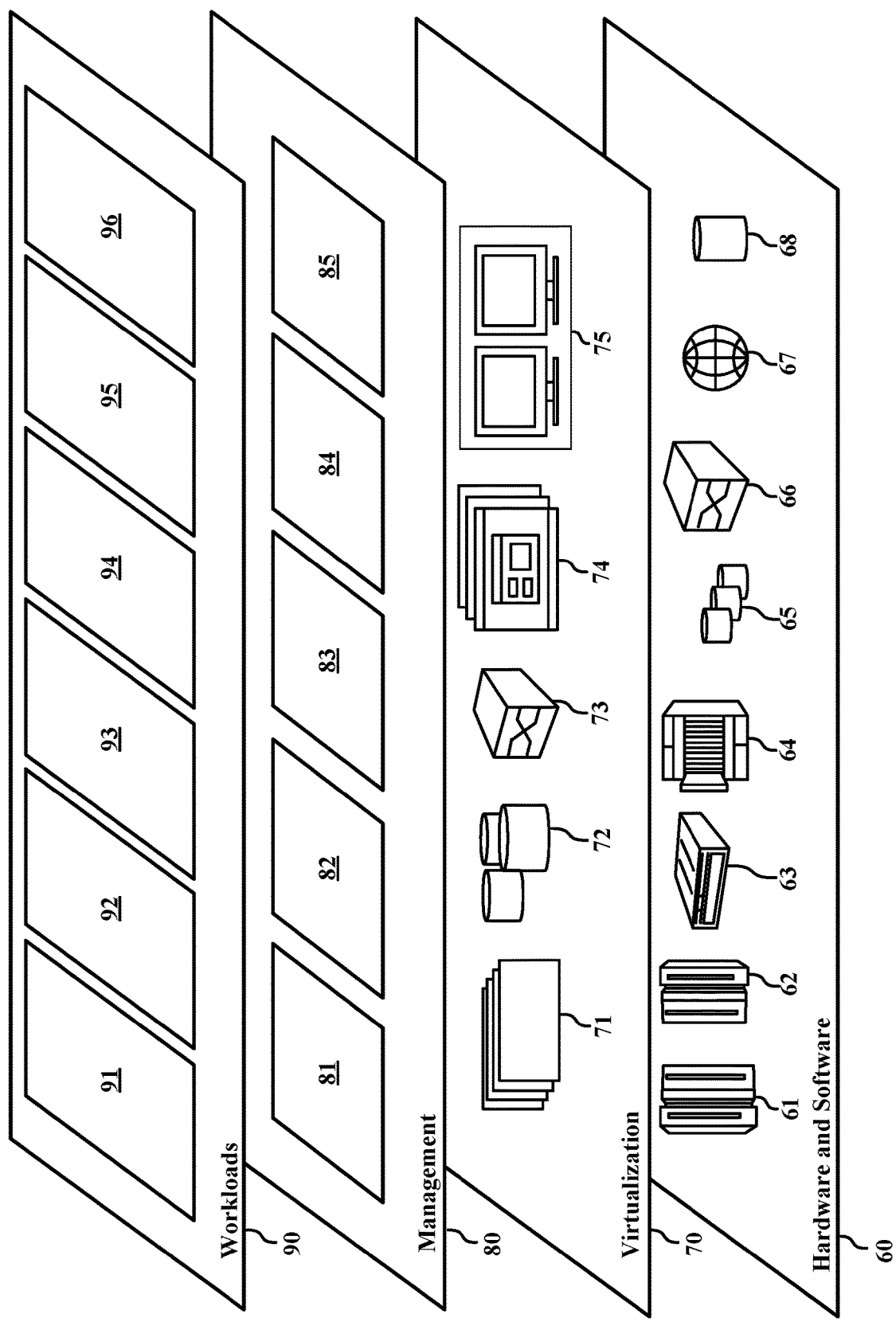
FIG. 6 depicts abstraction model layers according to embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and registered edge device management logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes obtaining device data for a set of edge devices; obtaining a predicted travel path of a focal entity; determining, for a first edge device of the set of edge devices and based on the device data, a first proximity of the first edge device to the predicted travel path; selecting the first edge device based, at least in part, on the first proximity; transmitting, in response to the selecting the first edge device, a workload to the first edge device; receiving, in response to the transmitting the workload, first captured data obtained by the first edge device; and transmitting the first captured data to an electronic user device.

Example 2 includes the method of example 1, including or excluding optional features. In this example, the predicted travel path comprises a first location and a second location, the focal entity in the first location at a first time, the focal entity predicted to be in the second location at a second time subsequent to the first time; the computer-implemented method further comprising: selecting a second edge device of the set of edge devices based, at least in part, on a second proximity of the second edge device to the second location; transmitting, in response to the selecting the second edge device, the workload to the second edge device; receiving, in response to the transmitting the workload to the second device, second captured data obtained by the second edge device; and transmitting the second captured data to the electronic user device.

Example 3 includes the method of any one of examples 1 to 2, including or excluding optional features. In this example, the transmitting the workload to the second edge device occurs at an intermediate time, the second time subsequent to the intermediate time.

Example 4 includes the method of any one of examples 1 to 3, including or excluding optional features. In this example, the device data includes additional data selected from the group consisting of: image capture resolution, image filtering capability, and data transmission speed; and the selecting the first edge device is based, at least in part, on the additional data.

Example 5 includes the method of any one of examples 1 to 4, including or excluding optional features. In this example, the method includes the determining the first proximity comprises determining that a first distance between the first edge device and the predicted travel path does not exceed a threshold.

Example 6 includes the method of any one of examples 1 to 5, including or excluding optional features. In this example, the workload comprises an instruction to capture one or more images associated with the focal entity, and the first captured data comprises the one or more captured images.

Example 7 includes the method of any one of examples 1 to 6, including or excluding optional features. In this example, the workload further comprises an image filter specification, and the one or more captured images comprise one or more images filtered according to the filter specification.

Example 8 includes the method of any one of examples 1 to 7, including or excluding optional features. In this example, the focal entity comprises a weather entity.

Example 9 is a computer-implemented method. The method comprising: obtaining device data for a set of edge devices; obtaining a predicted travel path of a focal entity; determining, for a subset of the set of edge devices and based on the device data, that the subset is within a threshold distance of the predicted travel path, the subset comprising a mobile phone and a camera mounted to a building; transmitting, in response to the determining, a workload to the subset; receiving, in response to the transmitting the workload, captured images obtained by the subset; and transmitting the captured images to an electronic user device.

Example 10 is a computer-implemented method. The method comprising: obtaining device data for a set of edge devices; obtaining a workload request from an electronic user device; obtaining a predicted travel path of a focal entity; determining, in response to the workload request, that a subset of the set of edge devices is within a threshold distance of the predicted travel path, the subset comprising a mobile phone and a camera mounted to a building; transmitting, in response to the determining, a workload corresponding to the workload request to the subset; receiving, in response to the transmitting the workload, captured images obtained by the subset; and transmitting the captured images to the electronic user device in response to the workload request.

Example 11 is a system comprising: one or more processors; and one or more computer-readable storage media storing program instructions which, when executed by the one or more processors, are configured to cause the one or more processors to perform a method according to any one of Examples 1 to 10.

Example 12 is a computer program product comprising one or more computer readable storage media, and program instructions collectively stored on the one or more computer readable storage media, the program instructions executable by one or more processors to cause the one or more processors to perform a method according to any one of Examples 1 to 10.

What is claimed is:

1. A computer-implemented method comprising:
   obtaining device data for a set of edge devices;
   obtaining a predicted travel path of a focal entity;
   determining, for a first edge device of the set of edge devices and based on the device data, a first proximity of the first edge device to the predicted travel path;
   selecting the first edge device based, at least in part, on the first proximity;
   transmitting, in response to the selecting the first edge device, a workload to the first edge device;
   receiving, in response to the transmitting the workload, first captured data obtained by the first edge device; and
   transmitting the first captured data to an electronic user device.

2. The computer-implemented method of claim 1, wherein the predicted travel path comprises a first location and a second location, the focal entity in the first location at a first time, the focal entity predicted to be in the second location at a second time subsequent to the first time;
   the computer-implemented method further comprising:
   selecting a second edge device of the set of edge devices based, at least in part, on a second proximity of the second edge device to the second location;
   transmitting, in response to the selecting the second edge device, the workload to the second edge device;
   receiving, in response to the transmitting the workload to the second edge device, second captured data obtained by the second edge device; and
   transmitting the second captured data to the electronic user device.

3. The computer-implemented method of claim 2, wherein the transmitting the workload to the second edge device occurs at an intermediate time, the second time subsequent to the intermediate time.

4. The computer-implemented method of claim 1, wherein the device data includes additional data selected from the group consisting of:
   image capture resolution,
   image filtering capability, and
   data transmission speed; and
   wherein the selecting the first edge device is based, at least in part, on the additional data.

5. The computer-implemented method of claim 1, wherein the determining the first proximity comprises determining that a first distance between the first edge device and the predicted travel path does not exceed a threshold.

6. The computer-implemented method of claim 1, wherein the workload comprises an instruction to capture one or more images associated with the focal entity, and
   wherein the first captured data comprises the one or more captured images.

7. The computer-implemented method of claim 6, wherein the workload further comprises an image filter specification, and
   wherein the one or more captured images comprise one or more images filtered according to the filter specification.

8. The computer-implemented method of claim 1, wherein the focal entity comprises a weather entity.

9. A system comprising:
   one or more processors; and
   one or more computer-readable storage media storing program instructions which, when executed by the one or more processors, are configured to cause the one or more processors to perform a method comprising:
   obtaining device data for a set of edge devices;
   obtaining a predicted travel path of a focal entity;
   determining, for a first edge device of the set of edge devices and based on the device data, a first proximity of the first edge device to the predicted travel path;

selecting the first edge device based, at least in part, on the first proximity;
transmitting, in response to the selecting the first edge device, a workload to the first edge device;
receiving, in response to the transmitting the workload, first captured data obtained by the first edge device; and
transmitting the first captured data to an electronic user device.

10. The system of claim 9, wherein the predicted travel path comprises a first location and a second location, the focal entity in the first location at a first time, the focal entity predicted to be in the second location at a second time subsequent to the first time;
the system further comprising:
selecting a second edge device of the set of edge devices based, at least in part, on a second proximity of the second edge device to the second location;
transmitting, in response to the selecting the second edge device, the workload to the second edge device;
receiving, in response to the transmitting the workload to the second device, second captured data obtained by the second edge device; and
transmitting the second captured data to the electronic user device.

11. The system of claim 10, wherein the transmitting the workload to the second edge device occurs at an intermediate time, the second time subsequent to the intermediate time.

12. The system of claim 9, wherein the device data includes additional data selected from the group consisting of:
image capture resolution,
image filtering capability, and
data transmission speed; and
wherein the selecting the first edge device is based, at least in part, on the additional data.

13. The system of claim 9, wherein the determining the first proximity comprises determining that a first distance between the first edge device and the predicted travel path does not exceed a threshold.

14. The system of claim 9, wherein the workload comprises an instruction to capture one or more images associated with the focal entity, and
wherein the first captured data comprises the one or more captured images.

15. The system of claim 14, wherein the workload further comprises an image filter specification, and
wherein the one or more captured images comprise one or more images filtered according to the filter specification.

16. The system of claim 9, wherein the focal entity comprises a weather entity.

17. A computer program product comprising one or more computer readable storage media, and program instructions collectively stored on the one or more computer readable storage media, the program instructions executable by one or more processors to cause the one or more processors to perform a method comprising:
obtaining device data for a set of edge devices;
obtaining a predicted travel path of a focal entity;
determining, for a first edge device of the set of edge devices and based on the device data, a first proximity of the first edge device to the predicted travel path;
selecting the first edge device based, at least in part, on the first proximity;
transmitting, in response to the selecting the first edge device, a workload to the first edge device;
receiving, in response to the transmitting the workload, first captured data obtained by the first edge device; and
transmitting the first captured data to an electronic user device.

18. The computer program product of claim 17, wherein the predicted travel path comprises a first location and a second location, the focal entity in the first location at a first time, the focal entity predicted to be in the second location at a second time subsequent to the first time;
the method further comprising:
selecting a second edge device of the set of edge devices based, at least in part, on a second proximity of the second edge device to the second location;
transmitting, in response to the selecting the second edge device, the workload to the second edge device;
receiving, in response to the transmitting the workload to the second device, second captured data obtained by the second edge device; and
transmitting the second captured data to the electronic user device.

19. The computer program product of claim 18, wherein the transmitting the workload to the second edge device occurs at an intermediate time, the second time subsequent to the intermediate time.

20. The computer program product of claim 17, wherein the device data includes additional data selected from the group consisting of:
image capture resolution,
image filtering capability, and
data transmission speed; and
wherein the selecting the first edge device is based, at least in part, on the additional data.

21. The computer program product of claim 17, wherein the determining the first proximity comprises determining that a first distance between the first edge device and the predicted travel path does not exceed a threshold.

22. The computer program product of claim 17, wherein the workload comprises an instruction to capture one or more images associated with the focal entity, and
wherein the first captured data comprises the one or more captured images.

23. The computer program product of claim 17, wherein the focal entity comprises a weather entity.

24. A computer-implemented method comprising:
obtaining device data for a set of edge devices;
obtaining a predicted travel path of a focal entity;
determining, for a subset of the set of edge devices and based on the device data, that the subset is within a threshold distance of the predicted travel path, the subset comprising a mobile phone and a camera mounted to a building;
transmitting, in response to the determining, a workload to the subset;
receiving, in response to the transmitting the workload, captured images obtained by the subset; and
transmitting the captured images to an electronic user device.

25. A computer-implemented method comprising:
obtaining device data for a set of edge devices;
obtaining a workload request from an electronic user device;
obtaining a predicted travel path of a focal entity;
determining, in response to the workload request, that a subset of the set of edge devices is within a threshold distance of the predicted travel path, the subset comprising a mobile phone and a camera mounted to a building;

transmitting, in response to the determining, a workload corresponding to the workload request to the subset;
receiving, in response to the transmitting the workload, captured images obtained by the subset; and
transmitting the captured images to the electronic user device in response to the workload request.

* * * * *